(12) United States Patent
Burch (10) Patent No.: US 6,206,319 B1
(45) Date of Patent: Mar. 27, 2001

(54) WIRE WINDING CLAMP

(75) Inventor: Jerry C. Burch, Northridge, CA (US)

(73) Assignee: Lebinal Components & Systems, Inc., Lombard, IL (US)

( * ) Notice: Subject to any disclaimer, the term of this patent is extended or adjusted under 35 U.S.C. 154(b) by 0 days.

(21) Appl. No.: 09/538,818

(22) Filed: Mar. 30, 2000

Related U.S. Application Data (60) Provisional application No. 60/127,025, filed on Mar. 31, 1999.

(51) Int. Cl.⁷ .................................................. H02K 15/085
(52) U.S. Cl. ..................................... 242/432.4; 242/432.6; 29/596
(58) Field of Search ............................. 242/432.2, 432.3, 242/432.4, 432.6; 29/596

(56) References Cited

U.S. PATENT DOCUMENTS

| | | |
|---|---|---|
| 2,998,937 | 9/1961 | Potter et al. . |
| 3,253,792 * | 5/1966 | Brown et al. ...................... 242/432.6 |
| 3,334,825 * | 8/1967 | Friedrich ........................... 242/432.4 |
| 3,414,204 | 12/1968 | Friedrich . |
| 3,648,938 | 3/1972 | Dryburgh . |
| 3,716,199 | 2/1973 | Ericson . |
| 4,498,636 | 2/1985 | Boesewetter et al. . |
| 4,679,312 * | 7/1987 | Nussbaumer et al. ............ 242/432.6 |
| 5,485,670 * | 1/1996 | Bouman et al. ................... 242/432.4 |
| 5,586,383 * | 12/1996 | Dolgas et al. ..................... 242/432.6 |
| 5,732,900 * | 3/1998 | Burch ................................ 242/432.6 |

* cited by examiner

*Primary Examiner*—Donald P. Walsh
*Assistant Examiner*—Emmanuel M. Marcelo
(74) *Attorney, Agent, or Firm*—Biebel & French (57) ABSTRACT

An apparatus and method for winding dynamoelectric machine field windings including a winding tool supported for longitudinal and rotational movement relative to a stator supported by a stator nest assembly. Upper and lower wire holders are supported on the winding tool and are slidably movable relative to the winding tool. The upper and lower wire holders are located on opposite sides of a stator to be wound and are biased by compression springs in a direction toward a respective end of the stator. As the winding tool reciprocates in a longitudinal direction, the upper and lower wire holders alternately engage the upper and lower ends of the stator to alternately clamp upper and lower end loops of field windings being formed by the apparatus.

24 Claims, 5 Drawing Sheets

WIRE WINDING CLAMP

RELATED APPLICATION

This Application claims the benefit of U.S. Provisional Application Ser. No. 60/127,025, filed Mar. 31, 1999, which application is incorporated herein by reference.

BACKGROUND OF THE INVENTION

1. Field of the Invention

The present invention relates generally to an apparatus for winding dynamoelectric machine field windings and, more particularly, to such an apparatus including a mechanism for preventing the field windings from moving out of a desired position on a stator during a winding operation.

2. Related Prior Art

Stator coil winding, machines are well known that use a moving wire dispensing element for dispensing wire into stator core slots from end to end of the stator core, passing over the end of the core and to an appropriate return slot, returning axially to the opposite core end, and continuing this motion until the coil is completed. One recognized shortcoming of such winding operations is the tendency of the wire forming the coil to move out of the slots of the stator core radially inwardly toward the interior of the stator core, such as may result from tension applied to the wire as the dispensing element is moved between the stator core ends to position the wire in a slot, which may interfere with the proper performance of the winding operation, result in misformed coils, as well as reduced slot fill.

The prior art has proposed various mechanisms for overcoming the problem associated with movement of the wire windings during the winding operation. For example. U.S. Pat. No. 3,414,204 to Friedrich discloses providing wire guiding fingers located adjacent end faces of a stator being wound. In operation, wire is wound over the fingers whereby the wire is held in a desired position as the stator is being wound.

In an alternative approach, shroud members are provided on either end of a stator wherein the shroud members define guiding surfaces for guiding wire into the stator core slots and for preventing the wire from falling to the interior of the stator core, such as is disclosed in U.S. Pat. No. 3,648,938 to Dryburgh.

U.S. Pat. No. 4,498,636 to Boesewetter discloses a further approach to maintaining the field windings within the stator core slot wherein a cylindrical winding tool is formed to closely fit within the interior of the stator core and includes opposing ends extending beyond the ends of the stator core such that the winding tool effectively closes off the slot openings to prevent wire from exiting into the interior of the stator core during the winding operation. However, this approach does not control movement of wire in the stator core slots to prevent displacement toward the central portion of the stator which can result in reduced slot fill.

Accordingly, in spite of the above described mechanisms for improving the operation of forming dynamoelectric field windings, there is a continuing need for a simple and effective mechanism for maintaining the field windings immovably in place on the stator core during the winding operation.

SUMMARY OF THE INVENTION

The present invention provides an apparatus for winding dynamoelectric machine field windings including a stator support for engaging and supporting a stator and a winding tool supported for reciprocating movement relative to the stator support. As the winding tool is reciprocated through a stator mounted on the stator support, wire is fed from a wire feed aperture in the side of the winding tool and into slots defined by radially inwardly extending teeth of the stator.

The winding tool is further supported for rotating or oscillating movement about a longitudinal axis of the winding tool. At each end of the reciprocating stroke of the winding tool, the winding tool is rotated to align the wire feed aperture with a different slot of the stator wherein the rotating movement of the winding tool corresponds to the formation of an end turn of the field winding or coil being formed within the stator.

A pair of wire holders or wire clamps are provided supported on the winding tool for reciprocating movement relative to the stator. A spring associated with each of the wire clamps biases each respective wire clamp toward the stator, and each wire clamp includes a surface extending substantially perpendicular to the longitudinal axis of the winding tool for engaging an end of the stator.

In operation, the wire clamps are alternately engaged with and disengaged from respective ends of the stator. In particular, as the winding tool is reciprocated to move the wire feed aperture along an internal slot of the stator core. and away from one end of the stator, a wire clamp is engaged with the end turns of field windings associated with the end of the stator from which the wire feed aperture is moving. The spring associated with the wire clamp permits the winding tool to move relative to the wire clamp while resiliently biasing the wire clamp against the end of the stator, and thus prevent radial inward movement of the wire as tension is applied to the wire.

Therefore, it is an object of the present invention to provide an apparatus for winding dynamoelectric machine field windings including providing a mechanism for engaging an end portion of a stator in cyclical engagement in order to hold the end turns of field windings in place.

It is a further object of the invention to provide such an apparatus wherein the means for engaging the ends of the stator include wire clamps mounted for reciprocating movement with a winding tool for the apparatus.

It is yet another object of the invention to provide a pair of winding clamps for alternately engaging with and disengaging from respective ends of a stator to facilitate maintaining field windings in place.

Other objects and advantages of the invention will be apparent from the following description, the accompanying drawings and appended claims.

DETAILED DESCRIPTION OF THE PREFERRED EMBODIMENT

Figure 1:
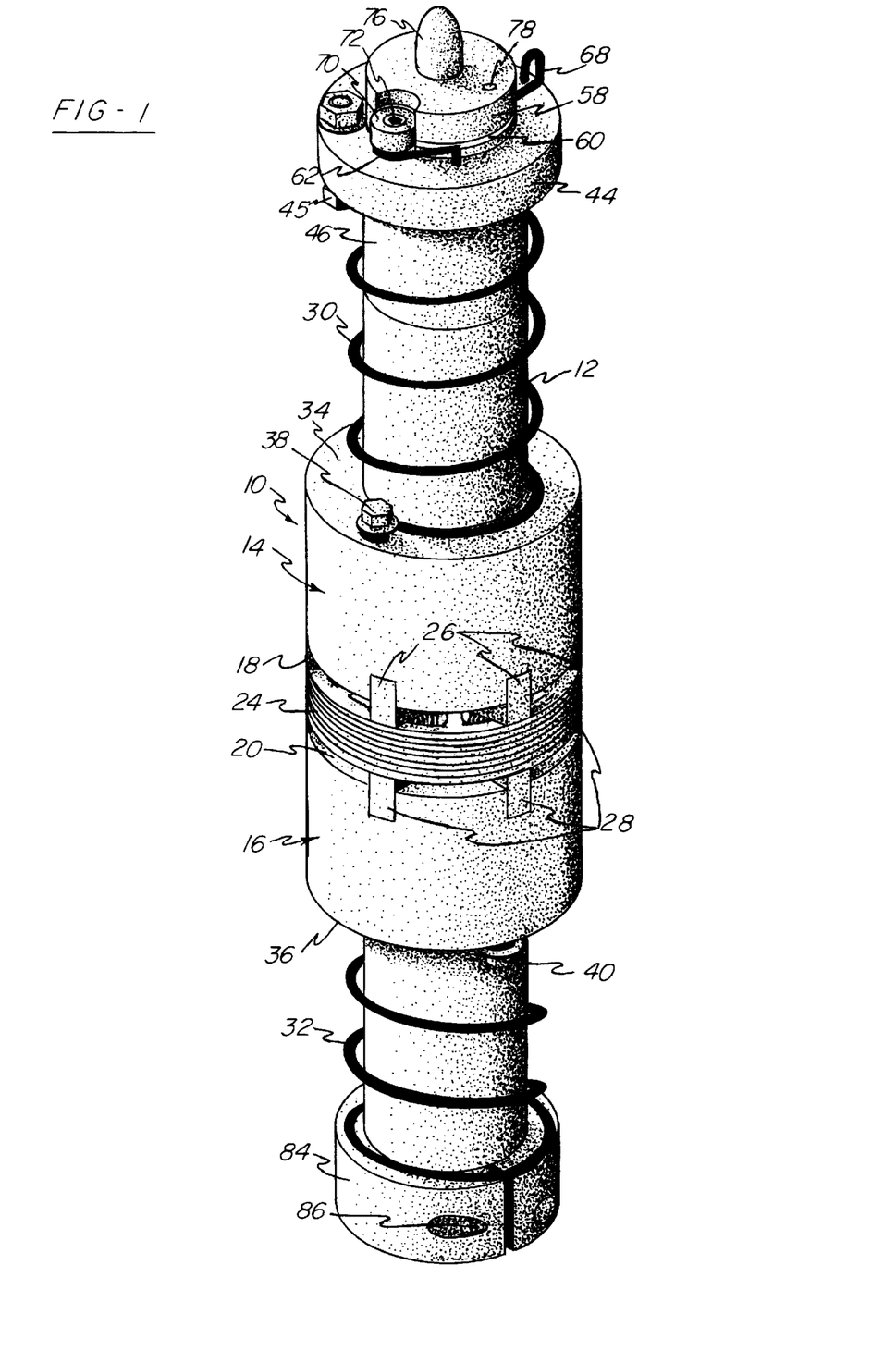
FIG. 1 is a perspective view of a winding tool incorporating the wire winding clamp of the present invention.

Referring, to FIG. 1, the wire winding, clamp 10 of the present invention is shown in combination with a winding tool 12 to which the wire winding clamp 10 is mounted. The wire winding clamp 10 includes an upper or first wire clamp 14 and a lower or second wire clamp 16, the first and second wire clamps 14, 16 including respective proximal facing surfaces 18, 20 positioned in facing relationship to each other for engagement with opposing ends of a stator 24, as will be described further below.

Figure 2:
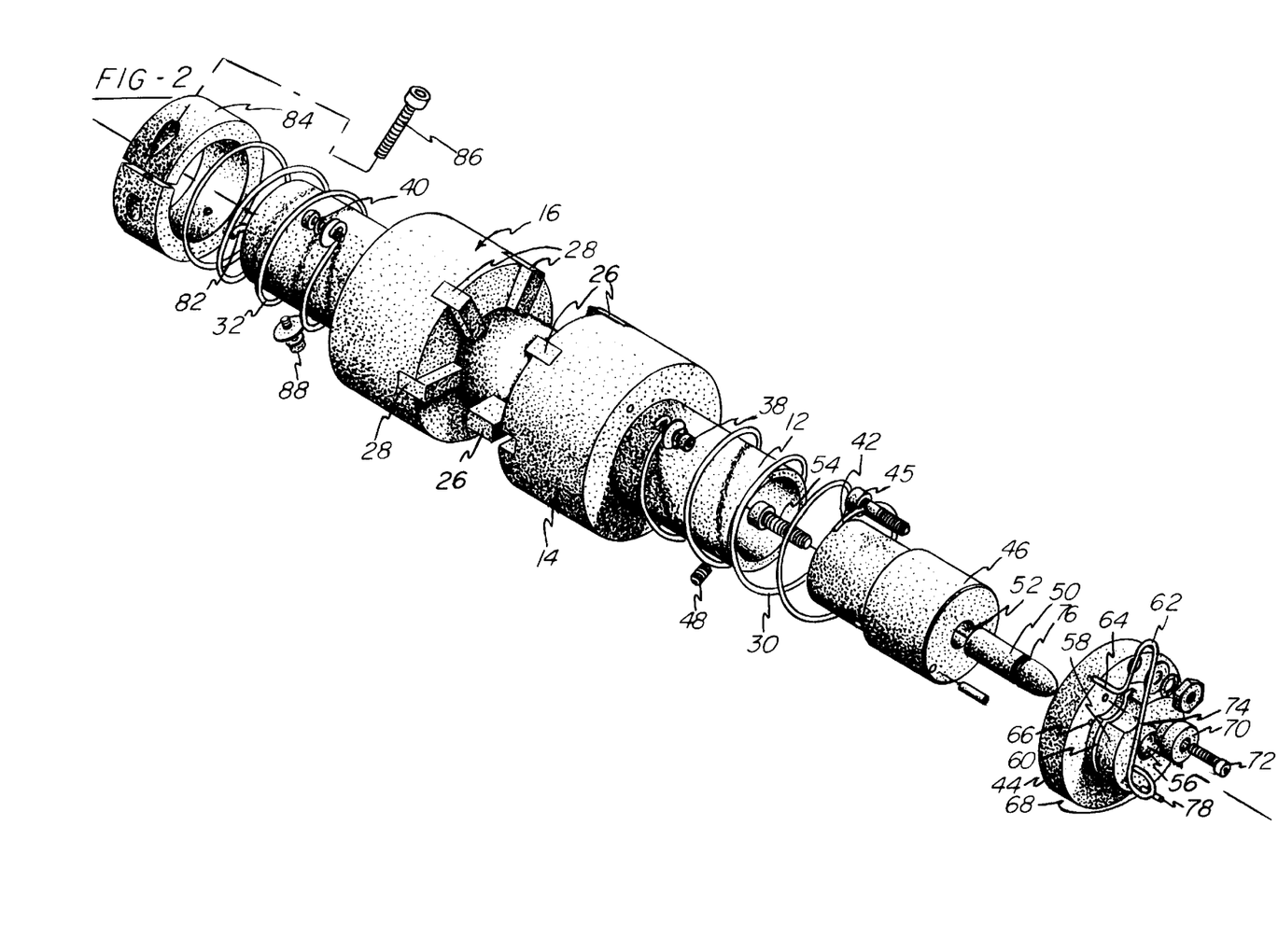
FIG. 2 is an exploded perspective view of the wire winding clamp of the present invention.

Referring to FIG. 2, each of the first and second wire clamps 14, 16 is formed as an annular cylindrical member positioned in sliding engagement over the winding tool 12, and adapted for longitudinal sliding movement parallel to the axis of the winding tool 12. The first wire clamp 14 is illustrated with a plurality of contact pads 26, and in particular is illustrated with three contact pads 26, and the second wire clamp 16 is provided with a corresponding number of contact pads 28. The contact pads 26 are paired with the contact pads 28 and extend axially from the respective facing surfaces 18, 20 of the wire clamps 14, 16, and are preferably, formed of a resilient material such as rubber. The number of pairs of contact pads 26, 28 provided to the wire clamps 14, 16 is dependent on the number of wire coils being formed simultaneously wherein in the preferred embodiment, from one to three pairs of contact pads 26, 28 may be provided to facilitate winding operations which wind one, two or three coils onto a stator core 24. However, it should be understood that any number of pairs of pads 26, 28 may be provided depending on the number of wire coils being simultaneously wound during a given winding, operation.

The contact pads 26, 28 are defined as circumferentially spaced discrete members whereby the pads 26, 28 may individually engage the end loops or end turns of different coils being formed during a winding operation. The resilient engagement between the pads 26, 28 and the wire of the coil end loops ensures that the coil wire is not damaged as a result of engagement with the pads 26, 28. Further. the provision of individual or discrete pads 26, 28 permits the pads to individually accommodate minor height variations between the coil end loops being engaged during the winding operation.

The wire winding clamp 10 further includes first and second coil springs 30, 32 attached to respective distal ends 34, 36 of the first and second wire clamps 14, 16 by fasteners 38, 40 affixed to the wire clamps 14, 16. Outer ends 42, 82 of the springs 30, 32 distal from the wire clamps 14, 16 are each affixed in stationary relationship relative to the winding tool 12. In the preferred embodiment, the outer end 42 of the spring 30 is detachably connected to the winding tool 12 to permit quick release and removal of the first wire clamp 14 for installation and removal of a stator 24 in between winding operations. As best seen in FIG. 2, the outer end 42 of the first spring 30 is attached to a cap member 44 by a bolt 45, and the cap member 44 is detachably mounted to the winding tool 12.

In the illustrated embodiment, a tool extension 46 is mounted to the end of the winding tool 12 and is held in place by a set screw 48. A pin or stud 50 is mounted in a central aperture 52 of the tool extension 46 and is held in place by a fastener 54. The cap 44 is provided with an aperture 56 which receives the stud 50 when the cap 44 is positioned on the end of the winding tool 12. The cap 44 is provided with a cap extension 58 including a groove 60 receiving a spring wire latch member 62. The latch member 62 includes a first end 64 received in an aperture 66 of the cap 44, and an axially outwardly extending handle portion 68 located at an opposite, second end of the latch member 62. The latch member 62 extends around a pivot bearing 70 held in place on the cap member by a fastener 72 wherein the pivot bearing 70 biases a central portion 74 of the latch member 62 within the groove toward the aperture 56 for engagement with a groove 76 defined in the stud 50 to hold the cap 44 in place. Thus, actuation of the handle 68 to move the central portion of the latch member 62 radially outwardly will result in disengagement from the groove 76 and thereby permit removal of the cap member 44 and associated first spring 30 and first wire clamp 14 from the winding tool 12.

In addition, a pin 78 is provided extending through the cap extension 58 and passing through the groove 60 to limit the radial outward movement of the latch member 62. An additional pin 80 may also be provided in the winding tool extension 46 to engage a cooperating aperture in the cap 44 and thereby provide circumferential alignment of the cap 44 and associated wire clamp 14 on the winding tool 12.

The outer end 82 of the second spring 32 is fastened to the winding tool 12 by means of a collar 84 which is clamped to the winding tool 12 by means of a tightening fastener 86. In addition, the end 82 of the spring 32 is attached to the outside of the collar 84 by means of a fastener 88. In operation of the second clamp 16, it is generally not necessary to remove the second clamp 16 since the stator 24 will be mounted for winding by positioning over the opposing end of the winding tool 12. Accordingly, a relatively permanent mounting, such as that provided by collar 84 may be incorporated for positioning the outer end 82 of the spring 32.

Figure 3:
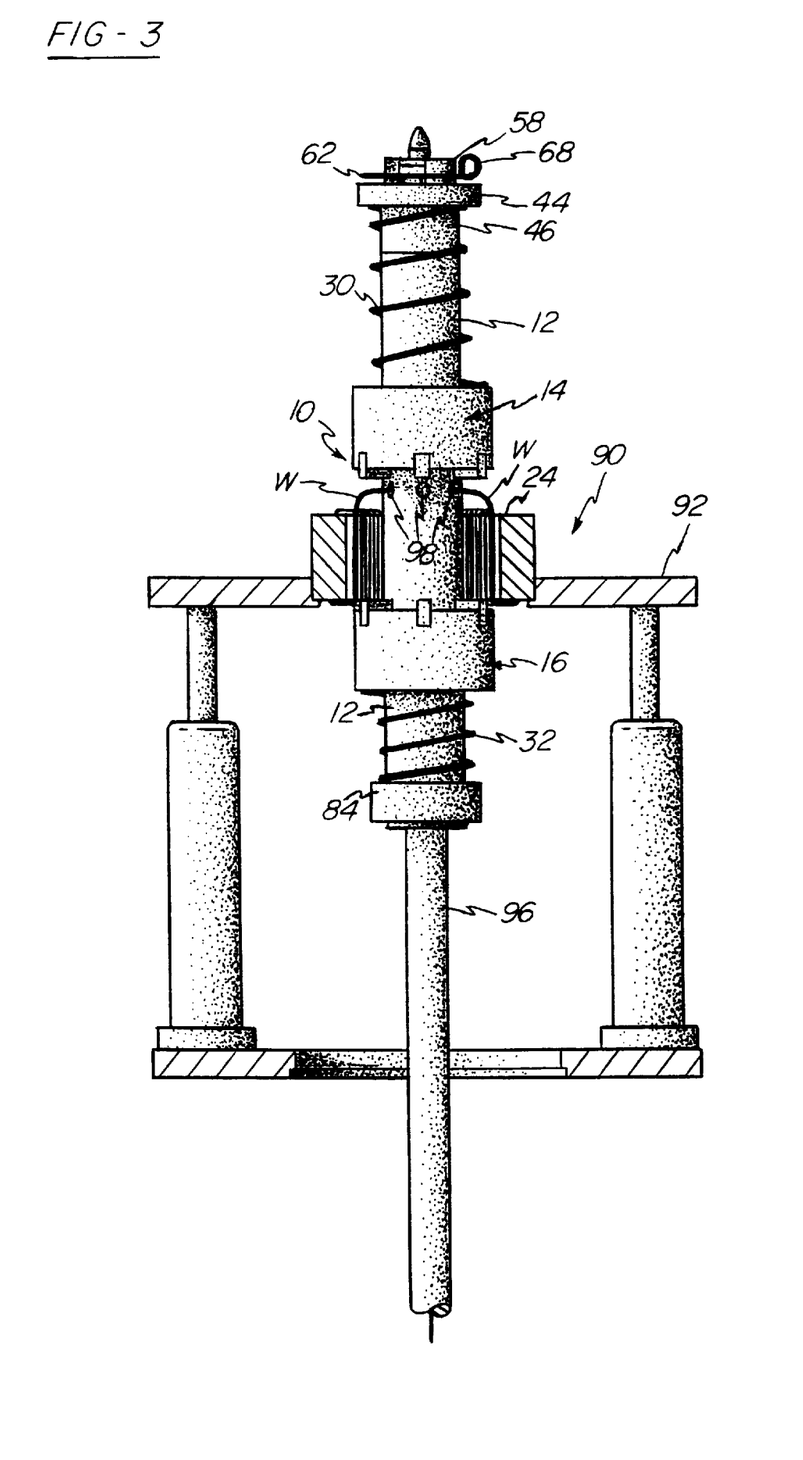
FIG. 3 is a side elevation view in partial cross-section illustrating a lower wire clamp in engagement with a stator during upward movement of the winding tool.
Figure 4:
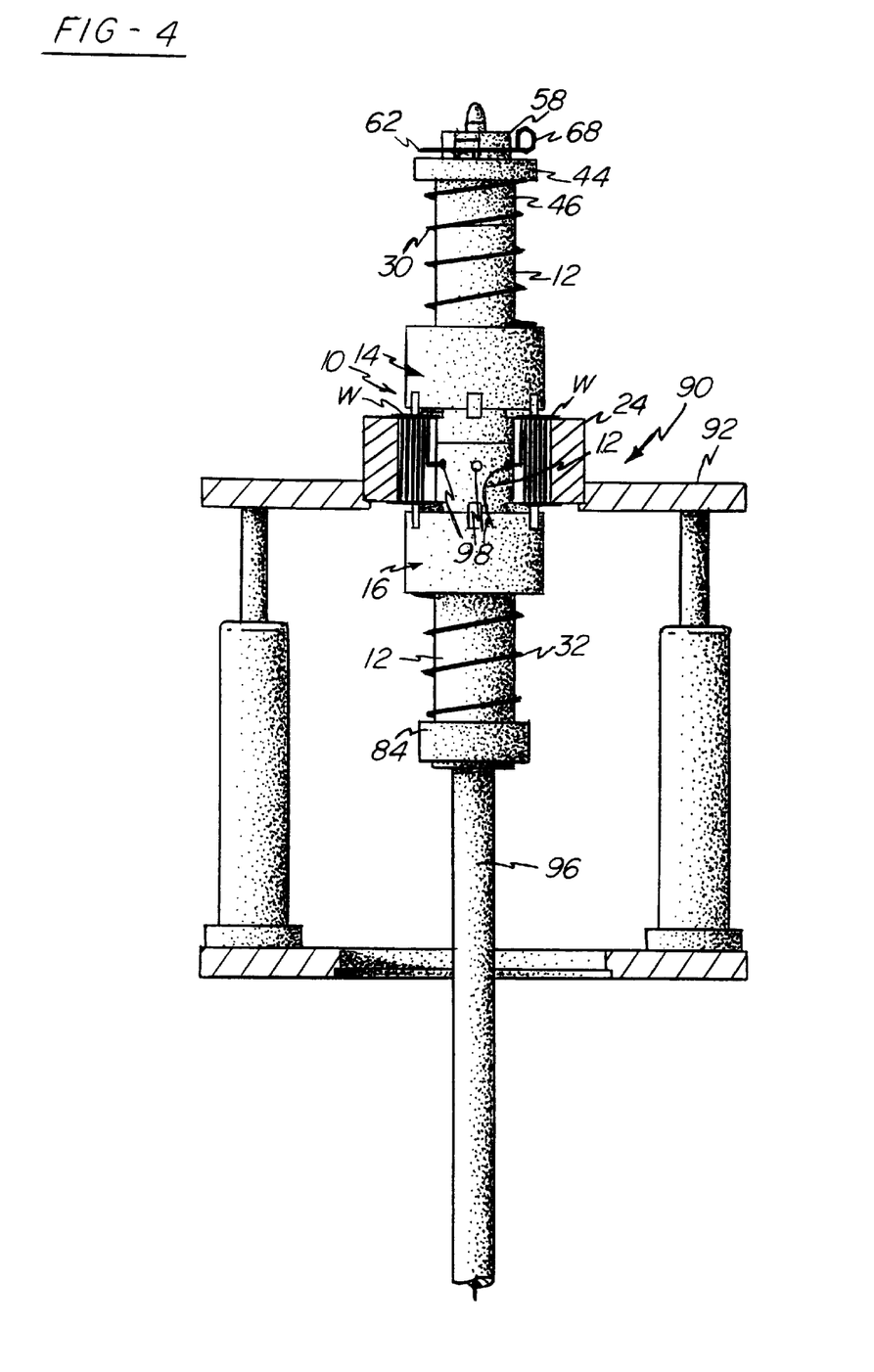
FIG. 4 is a side elevation view in partial cross-section showing a position of the winding tool at which the upper wire clamp transitions into engagement with the stator during, downward movement of the winding tool.
Figure 5:
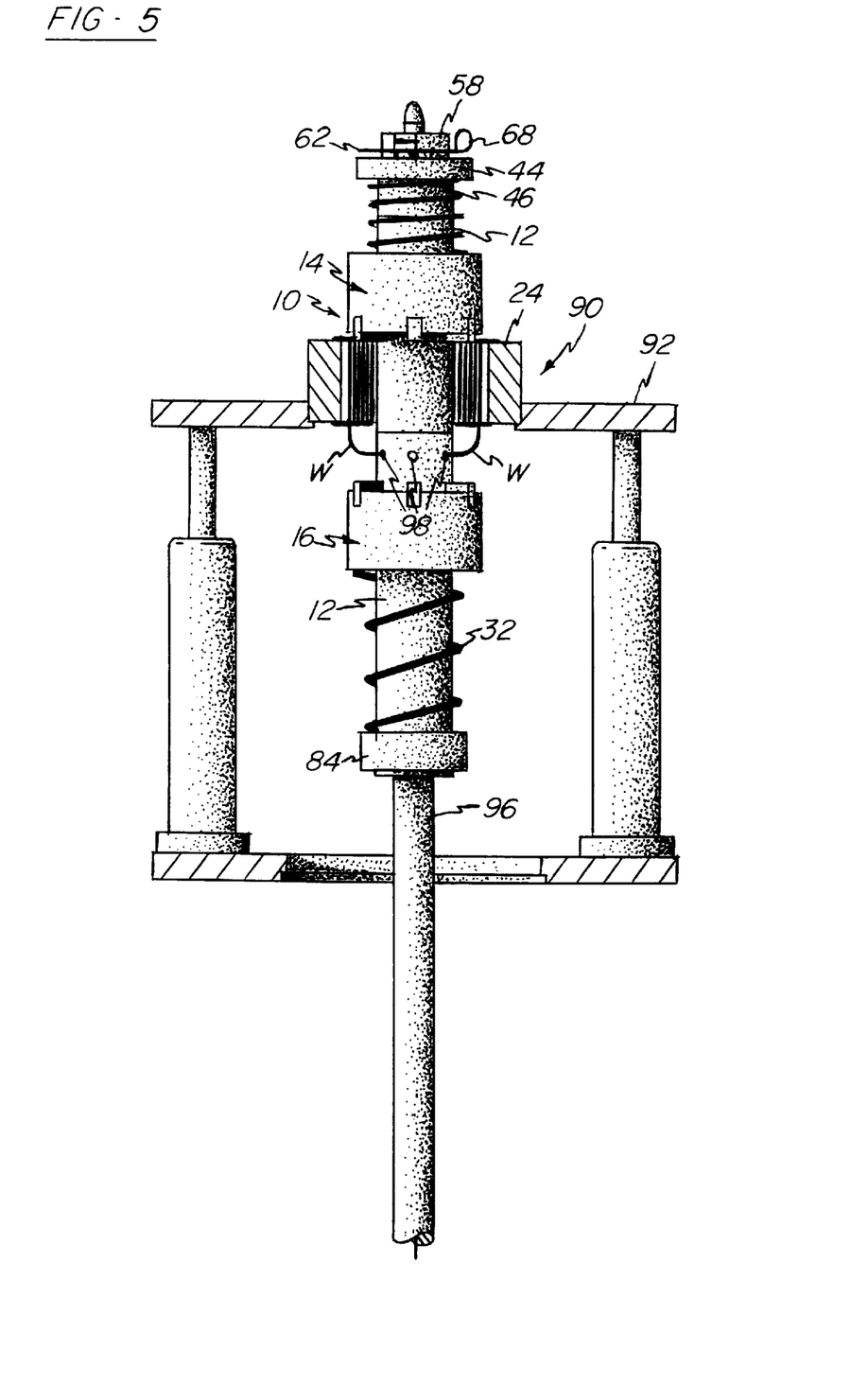
FIG. 5 is a side elevation view in partial cross-section showing, the winding tool at its lowermost position.

It should be apparent that the springs 30, 32 operate to bias the first and second wire clamps 14, 16 toward each other, and toward opposing faces of a stator 24 positioned therebetween. As will be described further below, movement of the winding tool 12 in a longitudinal direction will operate to alternately, or cyclically, position the wire clamps 14, 16 in engagement with the opposing faces of the stator 24 during a winding operation. Referring to FIGS. 3–5, a winding operation incorporating the wire clamp 10 of the present invention will now be described in greater detail.

The wire winding clamp 10 is designed to be incorporated into a winding machine 90 including a stator nest assembly having a platform 92 and a stator nest 94. The stator nest 94 is adapted to detachably engage and support a stator 24 to be wound by the winding apparatus 90. As illustrated in the present embodiment, the winding tool 12 extends upwardly through the platform 92 and is supported by a hollow spindle shaft 96 for driving the winding tool 12 in reciprocating and rotating or oscillating movement in a manner similar to that disclosed in U.S. Pat. No. 5,964,429, which patent is commonly assigned with the present application, and is incorporated herein by reference.

As described in the above noted patent, the spindle shaft 96 defines a wire passage which opens into a wire passage in the winding tool 12, and extends to a wire feed aperture or apertures 98. Wire W is fed through the apertures 98 at a predetermined controlled rate, and the winding tool 12 directs the wire W into slots of the stator 24 in a coil winding operation, as is more fully described in the above referenced U.S. Pat. No. 5,964,429. It should be noted that in the present embodiment, three wire feed apertures are disclosed for simultaneously feeding three wires W (only two shown) from the winding tool 12, however, the present invention may be configured to accommodate a single wire aperture 98 feeding a single wire W, or alternatively may be configured to feed any number of a plurality of wires W wherein the wire clamps 14, 16 are provided with a number of pairs of contact pads 26, 28 corresponding to the number of wires W being fed from the winding tool 12, and each of the contact pads 26, 28 including a contact surface extending substantially perpendicular to the longitudinal axis of the winding tool for engaging and holding in place the end turns of a wire coil being formed on the stator 24.

As may be understood from the above referenced U.S. Pat. No. 5,964,429, the winding tool 12 is moved longitudinally to feed wire W from the apertures 98 and into slots defined in the stator 24. At the end of its longitudinal movement, either upwardly or downwardly, the winding tool 12 is rotated to align the wire apertures 98 with different slots in the stator 24 and the winding tool 12 is moved longitudinally in an opposite direction from the previous longitudinal movement to again feed wire W through slots in the stator 24. During the rotating movement of the winding tool 20, a loop or end turn of the wire W is formed extending from the first slot to the second slot across the end of the stator 24. As seen in FIG. 3, the winding tool 12 has reached an upper end of its longitudinal stroke wherein the lower or second wire clamp 16 is positioned in engagement with the lower end of the stator 24, and the compression spring 32 has compressed to accommodate upward movement of the winding tool 12 relative to the second wire clamp 16 and thereby maintain a clamping force on the lower end turns of the wire coils being formed as the winding tool 12 moves upwardly.

After the winding tool 12 has rotated to align each of the wire apertures 98 with a further or a second slot, the winding tool 12 begins a downward longitudinal movement, carrying the upper or first wile holder 14 toward engagement with the upper end of the stator 24. FIG. 4 illustrates the position of the wire winding clamp 10 after engagement of the first wire clamp 14 with the upper end of the stator 24, and as the wire apertures 98 are moving downwardly between the ends of the stator 24. It can be seen that both of the wire clamps 14, 16 are positioned in engagement with the opposing ends of the stator 24 during this portion of movement of the winding tool 12. It can also be seen that the first wire clamp 14 will hold the upper end turns of the wire coils in place against any movement in response to tension applied to the wires W as they are pulled downwardly and inserted in the slots.

FIG. 5 illustrates the lowermost position of the winding tool 12 wherein the upper or first wire holder 14 is engaged with the upper end of the stator 24, and the lower or second wire holder 16 is disengaged from the stator 24 for permitting rotation of the winding tool 12 to form a loop in the wire W across the lower end of the stator 24 prior to upward movement of the winding tool 12 to insert wire into the initial or first slot during upward movement of the winding tool 12. In the position illustrated in FIG. 5, it can be seen that the first spring 30 has been compressed permitting the downward movement of the winding spindle 12 while maintaining a pressure on the upper end turns of the wire coils.

In addition, it should be noted that in the transition between the position shown in FIG. 4 and the position shown in FIG. 5, the second wire clamp 16 remains in engagement with the lower end of the stator 24 until just before the wire apertures 98 pass below the lower end of the stator 24. Similarly, the first wire clamp 14 will remain in contact with the upper surface of the stator 24 until just before the wire apertures 98 pass above the stator 24 during upward movement of the winding tool 12.

Thus, it should be apparent from the above description that the wire clamps 14, 16 are supported on the winding tool 12 for cyclically engaging opposing ends of the stator 24 in an alternating manner to clamp the wire coil windings being formed on the stator 24 without interfering with the efficient operation of the winding, tool as it distributes wire into the slots of the stator 24. In particulars the wire clamps 14, 16 are supported for movement with the winding tool 12 while also permitting relative movement between the winding tool 12 and the wire clamps 14, 16 when either of the wire clamps 14, 16 is engaged with an end of the stator 24. Further, the present winding wire clamp 10 provides means for quickly installing and removing a stator to and from a winding machine. Specifically, the present invention provides a quick release cap structure for removal of the upper or first wire clamp 14 to facilitate placement of a stator in the stator nest 94.

Also, the design of the contact pads 26, 28 on the wire clamps 14, 16 is such that the contact pads do not extend the entire circumference of the stator, and provide spaced, discrete pads for localized contact with the end turns of the wire coils being formed. In this manner, contact pressure on the wire coil end turns is assured to ensure that the wire end turns are not permitted to move during the winding operation.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An apparatus for winding dynamoelectric machine field windings, said apparatus comprising:
   a stator support for supporting a stator;
   a winding tool supported for reciprocating movement relative to said stator support;
   a wire feed aperture defined in a side of said winding tool;
   a wire clamp supported for reciprocating movement relative to said stator support for cyclical movement toward and away from engagement with an end of a stator supported in said stator support.

2. The apparatus of claim 1 wherein said wire clamp is supported for movement with said winding tool.

3. The apparatus of claim 2 wherein said wire clamp is further supported for movement relative to said winding tool and is resiliently biased toward said stator support.

4. The apparatus of claim 1 including a second wire clamp supported for reciprocating movement relative to said stator support for cyclical movement toward and away from engagement with an opposite end of a stator supported in said stator support.

5. The apparatus of claim 4 wherein said wire clamps are resiliently biased toward each other.

6. The apparatus of claim 5 wherein said wire clamps are supported for movement with said winding tool.

7. The apparatus of claim 4 wherein said wire clamps are mounted to said winding tool by respective first and second retainers, each of said wire clamps being resiliently movable relative to a respective retainer in a longitudinal direction parallel to a longitudinal axis of said winding tool.

8. The apparatus of claim 7 wherein said first retainer comprises a cap member attached to an end portion of said winding tool, and said second retainer comprises a collar clamped around a portion of said winding tool.

9. The apparatus of claim 7 wherein said first retainer comprises a cap member including a central aperture and said winding tool includes an upwardly extending shaft member for extending through said central aperture, and a latching mechanism for releasably retaining said cap member on said shaft member.

10. The apparatus of claim 9 wherein said latching mechanism comprises a groove on said shaft member and a resiliently biased catch member engaging said groove to prevent longitudinal movement of said cap member along said shaft member.

11. The apparatus of claim 1 wherein said winding tool is further supported for rotating movement about a longitudinal axis of said winding tool and said wire clamp is supported for rotating movement with said winding tool.

12. The apparatus of claim 1 wherein said wire clamp comprises an engagement surface extending substantially perpendicular to a longitudinal axis of said winding tool for engaging an end portion of a stator.

13. The apparatus of claim 12 wherein said wire clamp comprises an annular member positioned on said winding tool and includes a plurality of circumferentially spaced contact pads defining engagement surfaces for engaging an end portion of a stator.

14. An apparatus for winding dynamoelectric machine field windings, said apparatus comprising
a stator support for supporting a stator;
a winding tool supported for reciprocating movement relative to said stator support;
a wire feed aperture defined in a side of said winding tool;
a first wire clamp supported for reciprocating movement relative to said stator support for cyclical movement toward and away from engagement with a first end of a stator supported in said stator support;
a second wire clamp supported for reciprocating movement relative to said stator support for cyclical movement toward and away from engagement with a second end of a stator supported in said stator support; and
each wire clamp including at least one coil engaging surface for engaging end loops of a wire coil being wound on said stator.

15. The apparatus of claim 14 wherein said coil engaging surfaces comprise resilient surfaces for engaging, the wire coil end loops.

16. The apparatus of claim 14 wherein said winding tool is provided with a plurality of wire apertures for simultaneously winding a plurality of coils and each of said wire clamps is provided with a plurality of discrete coil engaging surfaces corresponding to the number of coils being wound.

17. The apparatus of claim 14 wherein each said coil engaging surface is resiliently biased toward a respective end of a stator supported in said stator support.

18. The apparatus of claim 17 wherein said coil engagement surfaces are resiliently biased by spring.

19. A method of winding dynamoelectric machine field windings said method comprising the steps of:
positioning a stator on a stator support;
moving a winding tool in reciprocating movement through said stator;
distributing wire from said winding tool onto said stator during said reciprocating movement;
moving at least one wire clamp to and from engagement with an end of said stator in response to said reciprocating movement of said winding tool.

20. The method of claim 19 including providing a second wire clamp and said step of moving said at least one wire clamp comprises alternately engaging wire end loops at opposing ends of said stator with said wire clamps.

21. The method of claim 20 wherein said wire clamps move in response to reciprocating movement of said winding tool.

22. The method of claim 20 wherein said winding tool moves relative to each of said wire clamps in a direction parallel to a longitudinal axis of said winding tool during engagement of a respective wire clamp with a respective end of said stator.

23. The method of claim 22 wherein each of said wire clamps is resiliently biased into engagement with a respective end of said stator during said movement of said winding tool relative to said wire clamps.

24. The method of claim 19 including the step of causing relative rotation between said winding tool and said stator to form a coil end turn at one end of the stator while a wire clamp engages wire end loops at an opposite end of said stator.

* * * * *

UNITED STATES PATENT AND TRADEMARK OFFICE
CERTIFICATE OF CORRECTION

PATENT NO. : 6,206,319 B1
DATED : March 27, 2001
INVENTOR(S) : Jerry C. Burch

It is certified that error appears in the above-identified patent and that said Letters Patent is hereby corrected as shown below:

<u>Title page,</u>
In Item (73), replace "Lebinal" with -- Labinal --.

Signed and Sealed this

Eighteenth Day of September, 2001

*Attest:*

*Nicholas P. Godici*

*Attesting Officer*

NICHOLAS P. GODICI
*Acting Director of the United States Patent and Trademark Office*